March 23, 1948.     C. M. HINES     2,438,394
ELECTRONIC VEHICLE CONTROL APPARATUS
Filed July 28, 1944
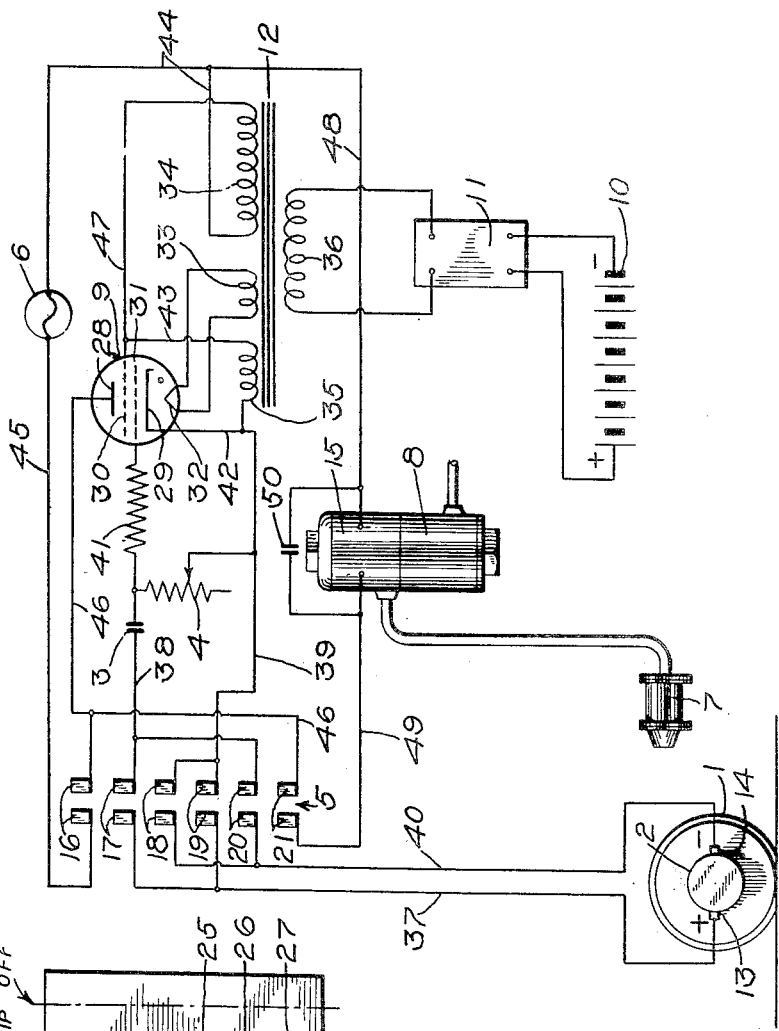
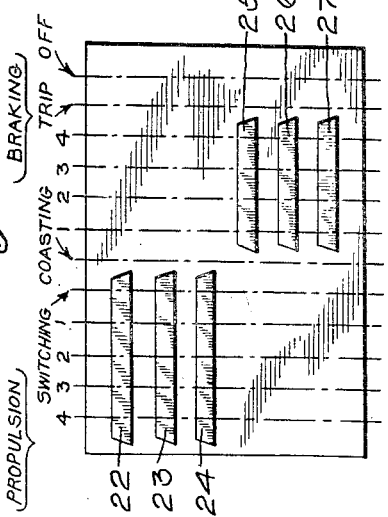
INVENTOR.
Claude M. Hines
BY
ATTORNEY Patented Mar. 23, 1948

2,438,394

UNITED STATES PATENT OFFICE 2,438,394

ELECTRONIC VEHICLE CONTROL APPARATUS

Claude M. Hines, Verona, Pa., assignor to The Westinghouse Air Brake Company, Wilmerding, Pa., a corporation of Pennsylvania Application July 28, 1944, Serial No. 547,031

14 Claims. (Cl. 192—2)

This invention relates to means for controlling propulsion and braking of a railway vehicle, and particularly to an electronic control apparatus arranged for corrective response to slipping of a vehicle wheel either during propulsion of the vehicle or during an application of the brakes.

The driving wheels on a railway traction vehicle or locomotive are subject to development of an undesired slipping or racing condition when excessive motive power is applied. An application of the brakes of the vehicle with disproportionate force may also cause the wheels to slip, or possibly to lock and slide on the rails. In either situation, such slipping of the wheels is regarded as intolerable under most railway service conditions, not only because of the danger of costly damage to the wheels, but also by reason of the adverse effects on operation and control of the vehicle. It is thus desirable to include as part of the equipment of a traction vehicle or locomotive a means devised to indicate incipient slipping or racing of the drivers during acceleration, and means operative to correct slipping of the same wheels that may develop upon an application of the brakes, provided efficient anti-wheel-slip means to accomplish these results can be constructed and operated economically.

It is a principal object of my invention to provide an electronic vehicle control apparatus combining in a single system means to accomplish the desired response to slipping of the wheels during acceleration of the vehicle and apparatus similarly effective during deceleration of the vehicle, the system being simply but efficiently constructed and arranged to permit use of inexpensive control elements of standard, commercially available types.

Another object of the invention is to provide electronic vehicle control apparatus including electrical means operative to measure a change in speed of a wheel of the vehicle, means for indicating slipping of the wheel during acceleration, other means for correcting a slipping condition of the wheel occurring while the brakes are applied, and electronic control means responsive to a predetermined output of the electrical means for governing the operation of both of the wheel slip responsive means.

A further object of the invention is to provide an electronic vehicle control apparatus of the type just referred to, in which the circuits through the medium of which the electronic control device functions in response to wheel slippage during acceleration at one time, and in response to wheel slippage during deceleration at another time can be selectively set up by operation of a switch device under the control of the motorman.

Other objects and advantages of the invention will appear in the following more detailed description thereof, taken in connection with the accompanying drawing, in which, Fig. 1 is a diagrammatic view showing an electronic vehicle control apparatus embodying features of the invention, in conjunction with an elementary type of fluid pressure brake for a driver wheel unit of the vehicle, and Fig. 2 represents a diagrammatic projection of the contact drum of the selector switch shown in Fig. 1.

Referring to Fig. 1, the equipment embodying my invention may comprise a driver or power operated wheel unit 1 of a locomotive, a direct current generator 2 adapted to be driven by the wheel unit, a condenser 3 adapted to be charged by the generator through a circuit including an adjustable resistor 4, a selector switch device 5 interposed in the circuit between the generator and the condenser, an acceleration wheel-slip responsive device or indicator lamp 6, a brake cylinder 7 associated with the wheel unit 1, a magnet valve device 8 for controlling the brake cylinder pressure, an electron discharge device or tube 9 for controlling energization of the indicator device 6 and of the magnet valve device 8, and suitable means for supplying electrical energy such as a battery 10, an inverter device 11, and a transformer 12.

The driver wheel unit 1 is adapted to be driven through the medium of a motor or other propulsion means carried by the locomotive and not shown in the drawing, and has an axle to which the generator 2 is suitably coupled. For the purpose of illustration the axle driven generator 2 is represented as being of the direct current type having a positive terminal 13 and a negative terminal 14 through which the generator is operative to deliver a low output voltage proportional to the speed of the driver wheel unit 1. The only elements of the fluid pressure brake apparatus associated with the wheel unit 1 illustrated in the drawing are the brake cylinder 7 and the magnet valve device 8 interposed in the brake cylinder pipe, but it will be understood that the complete equipment may include the usual control valve devices of a standard locomotive brake system. The magnet valve device 8 is interposed in the brake cylinder pipe through which fluid under pressure is supplied to the brake cylinder by the usual brake control apparatus (not shown) in effecting an application of the brakes. This magnet valve device may have any suitable construction comprising a release valve mechanism (not shown), which is normally positioned to maintain open the communication through the brake cylinder supply pipe, so as to permit the standard brake apparatus to control application and release of the brakes. The release valve mechanism of the magnet valve device 8 is arranged to be actuated, upon energization of a magnet 15 forming part of the device, for cutting off the supply of fluid under pressure to the brake cylinder while venting the brake cylinder to the atmosphere by way of a suitable exhaust port in the device, to effect a quick release of the brakes associated with the locomotive driver wheel unit 1.

According to the invention, the selector switch device 5 is adapted to be associated with a suitable controller device manually operable in controlling both propulsion and braking of the locomotive. The selector device 5 is illustrated diagrammatically in the drawing as comprising a plurality of spaced stationary contact elements 16, 17, 18, 19, 20 and 21, which are arranged in pairs adapted to be selectively connected in accordance with operation of a rotary drum carried by the brake propulsion controller device and provided with movable contact segments 22, 23, 24, 25, 26 and 27. Contact segments 22, 23, and 24 on the drum are adapted to be brought into bridging engagement with the pairs of stationary contacts 16, 17 and 18, respectively, when the engineer operates the controller for effecting propulsion of the locomotive. The contact segments 25, 26 and 27 are operatively aligned with the stationary contact elements 19, 20 and 21, so that when the controller is moved through the range of positions corresponding to different degrees of application of the brakes, the proper control circuits for the electronic vehicle control apparatus will be conditioned accordingly.

The electron discharge device 9 is of the type having an envelope filled with an ionizing medium, such as gas, and comprises an anode 28, a cathode 29, a shield grid 30 and a control grid 31. The tube is also provided with a filament 32, which is adapted to be energized through the medium of a circuit connected to a secondary winding 33 of the transformer 12. The anode-cathode circuit controlled by the tube 9 is conditionable by means of the selector switch device 5, as hereinafter explained, for at one time energizing the acceleration control device for indicator lamp 6, and at another time for energizing the magnet 15 of brake magnet valve device 8. In addition to the filament energizing secondary winding 33, the transformer device 12 has a secondary winding 34 for energizing the anode-cathode circuit of the tube 9, and a secondary winding 35 for impressing on the shield-grid 30 a biasing voltage tending to render the tube normally nonconductive. The usual primary winding 36 of the transformer is connected to the upper terminals of the inverter 11, which is constructed and arranged to deliver alternating current of a preselected frequency.

In operation, when the braking and propulsion controller (not shown) is moved into a propulsion position for causing the power unit of the locomotive to drive the wheel unit 1, the drum element of the selector switch 5 is at the same time moved to a position in which the contact segments 22, 23, and 24 bridge the respective pairs of stationary contact elements 16, 17 and 18. Assuming that the driver wheel unit 1 is accelerated at a normal rate, the direct current generator 2 is then operated to deliver current for charging the condenser 3 through a circuit including the positive terminal of the generator, a conductor 37, the connected contact elements 17, a conductor 38, the condenser 3, the resistor 4, a conductor 39, the connected pair of contact elements 18, and a conductor 40 leading to the negative terminal 14 of the generator. While the generator 2 is driven at an accelerating rate, a condenser charging current will flow through the capacitance circuit just traced, and a voltage drop will be created across the resistor 4 in such manner that the terminal of the resistor 4 connected to one side of condenser 3 will be of positive polarity with respect to the opposite end of the resistor. The control grid 31 of the electron discharge device 9 is connected through a current limiting resistor 41 to the point of connection of the resistor 4 with one side of condenser 3, so that during such time as current flows through the resistor 4, the positive potential at that point will be impressed upon the control grid 31 by reason of the connection of the opposite terminal of negative polarity through wire 42 to the cathode 29. The elements of the electronic system are so proportioned and arranged, however, that as long as the wheel unit 1 is not accelerated at an abnormal or slipping rate, the control grid 31 of the tube 9 cannot be driven sufficiently positive to cause the tube to become conductive, because of the negative voltage which is impressed upon the shield grid 30 during each positive half cycle of alternating current delivered through the medium of the transformer 12. The biasing circuit for the shield grid of the tube includes the left-hand end of the secondary winding 35, a conductor 42, the cathode 29, the shield grid 30, and a conductor 43 connected to the right-hand end of the secondary winding.

Thus while the driver wheel unit 1 rolls along the rails without slipping, the tube 9 remains nonconductive for maintaining open the circuit for the indicator lamp 6. If the driver wheel unit 1 should commence to slip or to race with respect to the rails, however, the resultant acceleration in speed of the axle driven generator 2 causes a flow of current through the circuit including the condenser 3 and resistor 4 at a rate in excess of the normal charging current, and a correspondingly higher than normal voltage is consequently impressed upon the control grid 31 of the tube 9. Since the tube 9 and the elements of the circuit associated therewith are proportioned for response to such an increase in biasing voltage impressed upon the grid 31, the tube is now rendered conductive, whereupon the signal lamp 6 is energized by pulsating current flowing through a circuit including the left-hand end of the secondary winding 34, a conductor 44, the lamp 6, a conductor 45, the connected contact elements 16, a conductor 46, the anode 28 of tube 9, the cathode 29, conductor 42, secondary winding 35, conductor 43, and a conductor 47 connected to the terminal of shield grid 30 and to the right-hand end of the secondary winding 34. It will thus be seen that the lamp 6 is energized during each positive half cycle of alternating current flowing through the circuit just traced, it being understood that the frequency of alternating current has been preselected to cause the lamp to emit a substantially steady glow. The locomotive engineer having thereby been informed of the slipping condition of the drivers by operation of the lamp 6, can then take steps to regain control of the locomotive, such as by effecting reduction in the propulsion power applied to the drivers or by causing sanding of the rails.

When the slipping condition of the driving unit 1 has been corrected, any current flowing through the circuit including the condenser 3 and resistor 4 during subsequent acceleration of the vehicle will be a measure of a normal rate of acceleration, so that the negative potential impressed upon the shield grid 30 during each positive half cycle of alternating current will again be effective to maintain the tube in a nonconductive state. The circuit for the indicating lamp 6 will thus be deenergized.

Assuming now that the vehicle is in motion and it is desired to effect an application of the brakes, upon operation of the braking and propulsion controller into a braking position, the drum element of the selector switch device 5 is turned to a position wherein the contact segments 22, 23, and 24 are held out of engagement with the corresponding stationary contact elements, while the contact segments 25, 26, and 27 are disposed in bridging relation with stationary contact elements 19, 20 and 21, respectively.

The direct current generator 2, still driven by the driver wheel unit 1, is then conditioned to supply current for reversing the polarity of the condenser 3 by charging it through a circuit including the positive terminal 13, conductor 37, connected contacted elements 19, the conductor 39, the resistor 4, the condenser 3, the conductor 38, connected contact elements 20, and conductor 40 leading to the negative terminal 14 of the generator. Meanwhile, application of the brakes has been effected by supply of fluid under pressure to the brake cylinder 7 by way of the usual communications, including the normally open valve passages within the magnet valve device 8. As the driver wheel unit 1 is thereby retarded, the reduction in voltage output of the decelerating generator 2 results in discharge flow of current from the condenser 3 through resistor 4 in a direction such as to cause the point of connection between resistor 4 and one side of condenser 3 to be of positive polarity or potential with respect to the opposite end of resistor 4 and thereby resulting in imposition of a positive biasing voltage on the control grid 31 of the tube 9. During deceleration of the wheel unit at a normal rate, however, the positive potential impressed on the control grid 31 remains insufficient to cause the tube 9 to fire, because of the fact that during each positive half cycle of alternating current when the anode 28 of the tube comes positive, the negative biasing voltage impressed at the same instant upon the shield grid 30 prevents the tube from becoming conductive.

It will thus be understood that the value of current discharged by the condenser 3 in the circuit controlled by the axle driven generator is substantially proportional to the rate of decrease in the voltage drop across the associated resistor 4, and consequently is a measure of the rate of deceleration of the wheel unit 1. By proper selection of the tube 9 and of the grid controlling elements associated therewith, the tube is maintained nonconductive as long as the condenser discharge current does not reach a value indicating a predetermined critical rate of deceleration of the driver wheel unit, which rate may in practice be about 10 M. P. H. per second, a rate of deceleration which has been found to occur only when a wheel is in a slipping condition. If this critical rate of deceleration is reached, due to development of a slipping condition of the driver wheel unit 1 during an application of the brakes, the resultant discharge flow of current from the condenser 3 through the circuit including the resistor 4 becomes high enough to create a positive voltage on the control grid 31 of the tube 9 rendering the tube conductive.

With the electron discharge device or tube 9 thus rendered conductive, in response to energization of the control grid to the degree indicating slipping of the driver wheel unit 1, as just explained, the magnet 15 of the magnet valve device 8 is at once energized to effect a quick discharge of fluid under pressure from the brake cylinder 7. The circuit for energizing the magnet 15 comprises the left-hand end of the secondary winding 34 of the transformer, the conductor 44, a conductor 48, the magnet winding, a conductor 49, the connected switch contact elements 21, the conductor 46, the anode 28 of the tube, the cathode 29, the conductor 42, the secondary winding 35, and conductors 43 and 47 leading to the right-hand end of the secondary winding 34. A quick release of the brakes acting on the driver wheel unit 1 is thus effected in time to prevent further retardation thereof into a locked or sliding state. It will be understood that although the electron discharge device 9 effects supply of a pulsating direct current through the circuit including the magnet winding of the magnet valve device 8, substantially steady energization of the magnet winding can be effectively insured by means of an auxiliary condenser 50 connected across the winding, as shown in the drawing.

When the brakes associated with the driver wheel unit 1 are released in the manner described, the wheel unit rapidly picks up speed until it is once again rotating at the speed of the locomotive. Upon such correction of the wheel slipping condition, the condenser 3 ceases to discharge current at the critical rate so that the control grid 31 of the tube 9 becomes less positive, rendering the shield grid 30 effective to regain control of the anode-cathode circuit of the tube 9. The circuit through the magnet 15 is thus again interrupted, and the magnet valve device 8 is restored to the normal condition to permit reapplication of the brakes.

To summarize, in the foregoing description of a preferred embodiment of my invention there has been disclosed an electronically controlled system selectively conditionable for automatic operation either to detect and indicate slippage of a locomotive driver wheel unit during acceleration, or to detect and effect correction of a slipping condition thereof during an application of the brakes. The improved operation of the locomotive equipment thus rendered possible is accomplished with a combination of relatively simple and inexpensive operating devices and control circuits, comprising an axle driven generator and condenser circuit for measuring the acceleration of the driver unit, electron discharge means responsive to a voltage produced in that circuit for controlling either an acceleration slippage indicating device or a brake release device, and selector switch means for setting up suitable grid and control circuits in the system depending upon the application of propelling force or braking force to the driver wheel unit.

Having now described my invention, what I claim as new and desire to secure by Letters Patent is:

1. In a propulsion and braking control apparatus for a vehicle of the type having a controller operative at one time to effect application of propulsion power to a wheel unit of the vehicle and at another time to effect application of braking power to the said wheel unit, the combination of means selectively and alternatively conditioned under the control of the said controller for operating responsively to the slipping of the wheel unit during application of propulsion power to the wheel unit or for operating responsively to the slipping of the wheel unit during application of braking power to the wheel unit, signal means arranged to be responsive to operation of said wheel slip responsive means during application of propulsion power to the wheel unit for indicating wheel slippage, and means arranged to be responsive to operation of said wheel slip responsive means during application of braking power to the wheel unit for causing a reduction in the degree of braking power applied to the wheel unit.

2. In a propulsion and braking control apparatus for a vehicle having a wheel unit to which propulsion power or braking power may be selectively applied, the combination of means operative to produce an electrical characteristic that is the measure of the acceleration or deceleration of said wheel unit, an electron discharge device having a control element and an anode-cathode path which is normally non-conductive, switch means effective while propulsion power is applied to the wheel unit to cause imposition of a biasing potential, corresponding in value to said electrical characteristic, on the control element of the electron discharge device in a manner such that when said electrical characteristic attains a certain value the anode-cathode path in said discharge device becomes conductive, said switch means being effective while braking power is applied to said wheel unit to cause imposition of a biasing potential, corresponding in value to said electrical characteristic, on the control element of said discharge device in a manner such that when the electrical characteristic attains said certain value the anode-cathode path becomes conductive, and two current-responsive devices, one of which is connected in circuit with the anode-cathode path of said discharge device under the control of the switch means while propulsion power is applied to the wheel unit and the other of which is connected in circuit with the anode-cathode path of the discharge device under the control of the said switch means while braking power is applied to the wheel unit.

3. In a propulsion and braking control apparatus for a vehicle having a wheel unit to which propulsion power or braking power may be selectively applied, the combination of a normally non-conductive electron discharge device having a control element, electrical means for producing an electrical characteristic corresponding to the rate of deceleration or to the rate of acceleration of the wheel unit, switch means selectively conditioned depending upon application of propulsion power or braking power to the wheel unit for causing imposition of a biasing potential, corresponding to the electrical characteristic, on the control element of said electron discharge device in such a manner as to cause the discharge device to be conductive so long as the electrical characteristic exceeds a certain value, current-responsive signal means, current-responsive brake control means, said switch means being effective during application of propulsion power to the wheel unit to establish a circuit to render the signal means energizable under the control of the discharge device and being effective during application of braking power to the wheel unit for establishing a circuit to render the brake control means energizable under the control of the discharge device.

4. In a propulsion and braking control apparatus for a vehicle having a wheel unit to which propulsion power or braking power may be selectively applied, the combination of means for supplying a voltage substantially proportional to the rotational speed of the wheel unit, a circuit on which the voltage supplied by the voltage supplying means is imposed, said circuit including a condenser and a resistor, switch means selectively conditioned depending upon whether propulsion power or braking power is being applied to the wheel unit for so controlling the relation of said condenser and said resistor in said circuit as to cause the same certain polarity of voltage across said resistor to be produced by discharge of said condenser in response to deceleration of the wheel unit as is produced by charging of said condenser in response to acceleration of the wheel unit, a normally non-conductive electron discharge device having a control element subject to a biasing potential corresponding in value and polarity to the voltage across said resistor and adapted to render the discharge device conductive so long as the biasing potential of said certain polarity exceeds a certain value, current-responsive signal means, current-responsive brake control means operative when energized to effect a reduction in the degree of braking power applied to the wheel unit, and switch means selectively conditioned while propulsion power is applied to the wheel unit for establishing a circuit to render the signal device energizable under the control of the discharge device, said switch means being effective while braking power is being applied to the wheel unit for establishing a circuit to render the brake control means energizable under the control of the discharge device.

5. In a propulsion and braking control apparatus for a vehicle having a wheel to which propulsion power or braking power may be selectively applied, the combination of means for producing an electrical characteristic corresponding substantially to the rate of deceleration or acceleration of the wheel unit, a normally non-conductive electron discharge device having a control element, switch means effective while propulsion power is applied to the wheel unit for impressing on the control element of the discharge device a biasing potential corresponding in value to that of the electrical characteristic and effective to cause said discharge device to be conductive so long as the electrical characteristic exceeds a certain value, said switch means being effective when braking power is applied to the wheel unit for causing a biasing potential to be impressed on the control element of the discharge device corresponding in value to that of the electrical characteristic and effective to cause said discharge device to be conductive so long as the electrical characteristic exceeds a certain value, and two current-responsive devices, one of which is connected by said switch means in a circuit controlled by the discharge device while propulsion power is applied to the wheel unit and the other of which is connected by the switch means in a circuit controlled by the discharge device while braking power is applied to the wheel unit.

6. In a vehicle having a wheel unit to which propulsion power or braking power may be selectively applied, the combination of a normally non-conductive electron discharge device having a control element, means for impressing a biasing potential on said control member in such a manner as to render the discharge device conductive upon slippage of the wheel unit during application of propulsion power or of braking power to the wheel unit, two current-responsive devices, and switch means conditioned while propulsion power is applied to the wheel unit for rendering one of said current-responsive devices subject to the control of the discharge device and conditioned while braking power is applied to the wheel unit for causing the other of said current-responsive devices to be subject to the control of the said discharge device.

7. In a vehicle having a wheel unit to which propulsion power may be applied, the combination of a normally non-conductive electron discharge device having a control element, means for impressing a biasing potential on said control element corresponding to the rate of acceleration of the wheel unit and effective to render the discharge device conductive when the wheel unit accelerates at a rate exceeding a certain rate, and current-responsive signal means operatively controlled by said discharge device.

8. In a propulsion and braking control apparatus for a vehicle having a wheel unit to which propulsion power or braking power may be selectively applied, the combination of means for supplying a voltage substantially proportional to the rotational speed of the wheel unit, a control circuit on which the voltage supplied by the voltage supply means is impressed and including a condenser, the current supplied to charge said condenser and discharged from said condenser in said control circuit being a measure of the rate of change in speed of the wheel unit, a signal circuit, a brake release circuit, a circuit-controlling device operatively responsive upon the occurrence of a preselected degree of current in said control circuit, and means selectively operative to render said circuit-controlling device effective to control only said signal circuit while propulsion power is applied to the wheel unit and to control only said brake release circuit when braking power is applied to the wheel unit.

9. In a propulsion and braking control apparatus for a vehicle having a wheel unit to which propulsion power or braking power may be selectively applied, the combination of means for supplying a voltage substantially proportional to the rotational speed of the wheel unit, a control circuit on which the voltage supplied by the voltage supply means is impressed and including a condenser and a resistor, the current supplied to charge said condenser and discharged from said condenser in said circuit producing a voltage drop across said resistor that is a measure of the rate of change in speed of said wheel unit, a signal circuit, a brake release circuit, a normally non-conductive electron discharge device having a control member subject to a biasing potential corresponding to the voltage drop across said resistor and effective to render said discharge device conductive only in response to the biasing potential impressed on said control member when wheel slippage occurs, and switch means selectively conditioned responsively to application of propulsion power or braking power to said wheel unit for connecting said discharge device in said signal circuit while propulsion power is applied to the wheel unit and in said brake release circuit while braking power is applied to said wheel unit.

10. In a propulsion and braking control apparatus for a vehicle having a wheel unit on which propulsion power or braking power may be selectively applied, the combination of electrical means operative to supply an electrical potential that is a measure of the rate of change of rotational speed of said wheel unit, a circuit-controlling device so constructed and arranged as to be operative in response to a predetermined degree of said electrical potential during application of propulsion power or of braking power to the wheel unit, a signal circuit, a brake control circuit, and switch means selectively conditioned depending upon application of propulsion power or braking power to the wheel unit for establishing different connections to cause the circuit-controlling device to control energization of said signal circuit during application of propulsion power to the wheel unit and energization of said brake control circuit during application of braking power to the wheel unit.

11. In a propulsion and braking control apparatus for a vehicle having a wheel unit on which propulsion power or braking power may be selectively applied, the combination of means for supplying a direct-current voltage of uniform polarity and substantially proportional to the rotational speed of the wheel unit, a control circuit on which the voltage supplied by the voltage supply means is impressed and including a condenser and resistor, the current supplied to charge said condenser and discharge from said condenser in said control circuit producing a voltage drop across said resistor that is a measure of the acceleration or deceleration, respectively, of said wheel unit, a signal circuit, a brake release circuit, a normally non-conductive electron discharge device having a control member subject to a biasing potential corresponding in polarity and value to the voltage across said resistor and adapted to render said discharge device conductive only in response to a positive biasing voltage exceeding a certain value, and switch means effective while propulsion power is applied to the wheel unit to connect said discharge device in said signal circuit and cause one certain polarity of voltage to be established across said resistor in response to acceleration of the wheel unit such that a positive biasing voltage is impressed on the control member, and effective while braking power is applied to the wheel unit to connect the discharge device in said brake release circuit and cause said certain polarity of voltage to be established across said resistor in response to deceleration of the wheel unit such that a positive biasing voltage is impressed on said control member.

12. In a vehicle having a wheel unit to which propulsion power or braking power may be selectively applied, the combination of a normally non-conductive electron discharge device of the gaseous type having a control element, a source of alternating-current voltage, means for impressing a biasing voltage on said control element so as to render said discharge device conductive when slippage of the wheel unit occurs during application of propulsion power or of braking power to the wheel unit, two current-responsive devices, and switch means effective during application of propulsion power to the wheel unit for associating said discharge device with one of said current-responsive devices in a manner to cause energization of the said one current-responsive device under the control of the discharge device by current supplied from said source, said switch means being effective during application of braking power to the wheel unit for associating the discharge device with the other of said current-responsive devices in a manner to cause energization thereof under the control of the discharge device by current supplied from said source.

13. In a vehicle of the type having a wheel unit to which propulsion power or braking power may be selectively applied, the combination of an electron discharge device of the gaseous type having a first control element and a second control element, a source of alternating-current voltage, said first control element being subject to a biasing voltage from said source rendering said discharge device normally non-conductive, means for impressing a biasing potential on said second control element of the discharge device in such a manner as to render the discharge device conductive upon slippage of the wheel unit during application of propulsion power or during application of braking power to the wheel unit, two current-responsive devices, switch means arranged to be effective during application of propulsion power to the wheel unit for associating said discharge device with one of said current-responsive devices in a manner to cause energization of said one current-responsive device by current supplied from said source under the control of the discharge device, said switch means being also arranged to be effective during application of braking power to the wheel unit for associating said discharge device with the other of said current-responsive devices in a manner to cause energization of said other current-responsive device by current supplied from said source under the control of said discharge device.

14. In a propulsion and braking apparatus for a vehicle having a driver wheel unit on which motive power or braking power may be selectively applied, the combination of generator means for producing a voltage substantially proportional to the speed of the said driver wheel unit, a control circuit adapted to be energized by said generator means and including a condenser and a resistor, the current supplied in said circuit to charge said condenser in response to acceleration of said driver wheel unit and the current discharged from said condenser in said circuit upon deceleration of said driver wheel unit being a measure of the rate of acceleration or of the rate of deceleration of said driver wheel unit, a signal circuit, a brake release circuit, an electron discharge device having a normally non-conductive anode-cathode path and a control member so connected to said control circuit as to be subject to a biasing potential, said anode-cathode path of said discharge device being rendered conductive upon a preselected positive potential being impressed on said control member occurring only in the event of slippage of said driver wheel unit, and selector switch means for so controlling the said generator means as to cause it to supply a voltage of one polarity in said control circuit during application of motive power to the driver wheel unit and a voltage of opposite polarity in said control circuit during application of braking power to the driving wheel unit, thereby to always effect the impression of a positive biasing potential on said control member, said selector switch means being also operative to connect the anode-cathode path of said discharge device in said signal circuit during application of motive power to the driver wheel unit and in said brake release circuit during application of braking power to the driver wheel unit.

CLAUDE M. HINES.

REFERENCES CITED

The following references are of record in the file of this patent:

UNITED STATES PATENTS

| Number | Name | Date |
|---|---|---|
| 687,948 | Wood | Dec. 3, 1901 |
| 2,092,366 | Baughman | Sept. 7, 1937 |
| 2,249,955 | Hewitt | July 22, 1941 |
| 2,321,059 | Anderson | June 8, 1943 |
| 2,322,022 | Hewitt | June 15, 1943 |
| 2,332,584 | McCune | Oct. 26, 1943 |

FOREIGN PATENTS

| Number | Country | Date |
|---|---|---|
| 112,425 | Germany | Aug. 17, 1900 |